(12) United States Patent
Tauschek et al.

(10) Patent No.: US 11,566,549 B2
(45) Date of Patent: Jan. 31, 2023

(54) EXHAUST GAS HEATING ASSEMBLY

(71) Applicant: Purem GmbH, Neunkirchen (DE)

(72) Inventors: Thomas Tauschek, Ostfildern (DE); Jürgen Zavadil, Esslingen (DE); Markus Tüch, Bad Überkingen (DE); Ralf Riekers, Stuttgart (DE); Alexej Schacht, Salach (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/528,948

(22) Filed: Nov. 17, 2021

(65) Prior Publication Data
US 2022/0154618 A1 May 19, 2022

(30) Foreign Application Priority Data
Nov. 18, 2020 (DE) ............... 10 2020 130 429.3

(51) Int. Cl.
*F01N 3/027* (2006.01)
*F01N 3/20* (2006.01)

(52) U.S. Cl.
CPC .................. *F01N 3/2013* (2013.01)

(58) Field of Classification Search
CPC ...... F01N 3/2013; F01N 2240/16; H05B 3/06
See application file for complete search history.

(56) References Cited

U.S. PATENT DOCUMENTS

| 4,723,973 A * | 2/1988 | Oyobe ................ F01N 3/027 60/303 |
| 5,992,399 A * | 11/1999 | Anderson ........... F28F 9/0234 123/549 |
| 11,008,912 B2 | 5/2021 | Gaiser |
| 2014/0190151 A1 * | 7/2014 | Culbertson ......... F24H 9/1818 60/303 |
| 2020/0300141 A1 * | 9/2020 | Gaiser ............... B01D 53/9454 |

FOREIGN PATENT DOCUMENTS

| DE | 10 2019 107 384 A1 | 9/2020 |
| DE | 202020104976 U1 * | 11/2020 |
| JP | 04339122 A * | 11/1992 |
| WO | 2014/100118 A1 | 6/2014 |
| WO | 2017/151975 A1 | 9/2017 |

* cited by examiner

Primary Examiner — Jonathan R Matthias
(74) Attorney, Agent, or Firm — Walter Ottesen, P.A.

(57) ABSTRACT

An exhaust gas heating assembly for an exhaust gas system of a combustion engine includes a heating unit housing which accommodates a flow of exhaust gas. A plurality of heating units are disposed in the heating unit housing and are elongate in the direction of a heating unit longitudinal axis (H). Each heating unit has first and second heating unit longitudinal end regions. The heating units with the first heating unit longitudinal end regions and the second heating unit longitudinal end regions are supported in relation to the heating unit housing via a support structure. At least one heating unit by way of the first heating unit longitudinal end region thereof or/and the second heating unit longitudinal end region thereof is supported on the support structure so as to be movable in the direction of the longitudinal axis (H).

18 Claims, 6 Drawing Sheets

EXHAUST GAS HEATING ASSEMBLY

CROSS REFERENCE TO RELATED APPLICATION

This application claims priority of German patent application no. 10 2020 130 429.3, filed Nov. 18, 2020, the entire content of which is incorporated herein by reference.

TECHNICAL FIELD

The present disclosure relates to an exhaust gas heating assembly for an exhaust gas system of an internal combustion engine, having a heating unit housing which is able to be passed through by a flow of exhaust gas.

BACKGROUND

An exhaust gas heating assembly for an exhaust gas system of an internal combustion engine in a vehicle is known from U.S. Pat. No. 11,008,912, in which a helically wound heating unit is disposed in a tubular heating unit housing which is configured having a substantially circular circumferential contour. The heating unit includes a jacket heating conductor having a jacket, and a heating conductor element which runs in the jacket. By applying a voltage to the heating conductor element, the latter is passed through by an electric current. The heating which is created here by virtue of the electric resistance is transmitted by way of the jacket to a heat transmission formation which surrounds the jacket on the external side of the latter. The heat transmission formation has a meandering structure, having heat transmission portions which are disposed so as to be substantially mutually parallel and connected to one another in connection portions and in a respective central region penetrated by the jacket. Exhaust gas, which flows through the heating unit housing in an exhaust gas primary flow direction which corresponds substantially to the direction of a housing longitudinal axis, flows along the surfaces of the heat transmission portions or connection portions, respectively, and hereby absorbs heat.

By way of an exhaust gas heating assembly of this type, the exhaust gas flow can be heated and thus introduce heat into system regions, in particular exhaust gas treatment assemblies, which are positioned downstream of the exhaust gas heating assembly, in particular in a start-up phase of the operation of an internal combustion engine in which the exhaust gas emitted by the internal combustion engine has a comparatively low temperature, and the exhaust gas treatment assemblies provided in the exhaust gas system, in particular one or a plurality of catalytic converters, still have a comparatively low temperature and an efficient reduction of the proportion of pollutants contained in the exhaust gas is thus not yet achievable. As a consequence, the duration during which an efficient exhaust gas treatment cannot take place at the beginning of the operation of the internal combustion engine can be significantly shortened.

SUMMARY

It is an object of the present disclosure to provide an exhaust gas heating assembly for an exhaust gas system of an internal combustion engine which, while providing a mechanically stable construction, enables an efficient transmission of heat to exhaust gas flowing in an exhaust gas system.

According to the disclosure, this object is achieved by an exhaust gas heating assembly for an exhaust gas system of an internal combustion engine, including a heating unit housing which is able to be passed through by a flow of exhaust gas, and a plurality of heating units which are disposed in the heating unit housing and are elongate in the direction of a heating unit longitudinal axis, having in each case a first heating unit longitudinal end region and a second heating unit longitudinal end region, wherein the heating units in the first heating unit longitudinal end regions thereof and the second heating unit longitudinal end regions thereof via a support structure are supported in relation to the heating unit housing, wherein at least one, preferably each, heating unit by way of the first heating unit longitudinal end region thereof or/and the second heating unit longitudinal end region thereof is supported on the support structure so as to be movable in the heating unit longitudinal direction.

In the construction of an exhaust gas heating assembly according to the disclosure, the heating units, at least in one of the end regions thereof, are supported so as to be movable in relation to the heating unit housing such that excessive stress, which in the heating operation is created by a thermally induced expansion of the heating units, is avoided in those regions in which the heating units are supported in relation to the heating unit housing. As a result of the relative movement between the heating units in at least one of the longitudinal end regions thereof and the housing, enabled in the construction according to the disclosure, the longitudinal variation of the heating units which arises during heating as well as when cooling the heating units can be compensated for or absorbed, respectively. It is particularly advantageous here when a relative movement of this type in relation to the heating unit housing is enabled in both longitudinal end regions of the heating units such that, as a result of the additional guiding, an increase in terms of the resonance frequency of the heating units, which are also to be considered as the frequency response system, is achieved and the occurrence of resonance frequencies which leads to excessive stress on the connection to the heating unit housing can likewise be avoided.

In order for the coupling of the heating units to the heating unit housing that permits a relative movement between the heating units and the heating unit housing to be implemented in a simple manner in terms of construction, it is proposed that the support structure, so as to be assigned to the first heating unit longitudinal end regions, includes a first support element which is supported on the heating unit housing and in the region of the support element passage openings is penetrated by the heating units, or/and that the support structure, so as to be assigned to the second heating unit longitudinal end regions, includes a second support element which is supported on the heating unit housing and in the region of support element passage openings is penetrated by the heating units.

At least one, preferably each, heating unit in the first heating unit longitudinal end region thereof here can penetrate a support element passage opening in such a manner that the first heating unit longitudinal end region in relation to the first support element is movable in the direction of the heating unit longitudinal axis, or/and at least one, preferably each, heating unit in the second heating unit longitudinal end region thereof can penetrate a support element passage opening in such a manner that the second heating unit longitudinal end region in relation to the second support element is movable in the direction of the heating unit longitudinal axis. The heating units in the respective support element passage openings, while generating a friction fit, can be held in such a manner that a relative movement in relation to a respective support element is possible in the region of the support element passage openings, on the one hand, and that energy can also be dissipated as a result of this relative movement and the occurrence of vibrations can thus be precluded, on the other hand.

In a configuration which likewise permits relative movement, it can be provided that the first support element is flexible in the direction of the heating unit longitudinal axis, and that at least one, preferably each, heating unit in the first heating unit longitudinal end regions thereof is established on the first support element, or/and that the second support element is flexible in the direction of the heating unit longitudinal axis, and that at least one, preferably each, heating unit in the second heating unit longitudinal end regions thereof is established on the second support element. The flexibility, thus the substantially elastic deformation capability, of the support elements thus enables a movement of the heating units, which are fixedly attached to the support elements, for example by brazing, in relation to the heating unit housing, such that the thermally induced longitudinal variation of the heating units can be absorbed by a deformation of the support elements which are fixedly connected to the latter, as a result of which, in particular, excessive stress on the regions in which the heating units are fixedly attached to a respective support element is also avoided, the regions being generated by a materially integral connection or else a firm friction fit, for example.

A configuration which is simple to implement and in particular also guarantees the required flexibility can be achieved in that the first support element is configured so as to be substantially U-shaped, having two U-legs and a connecting web that connects the two U-legs, wherein a first U-leg of the first support element is established on the heating unit housing and the support element passage openings of the first support element are provided in a second U-leg of the first support element, or/and wherein the connecting web of the first support element is disposed in the direction toward an inflow side of the heating unit housing, or/and that the second support element is configured so as to be substantially U-shaped, having two U-legs and a connecting web that connects the two U-legs, wherein a first U-leg of the second support element is established on the heating unit housing and the support element passage openings of the second support element are provided in a second U-leg of the second support element, or/and wherein the connecting web of the second support element is disposed in a direction toward an inflow side of the heating unit housing. Depending on the choice of the material thickness of the U-shaped support elements, which are bent from a sheet-metal material, for example, the support elements can be configured so as to be either substantially rigid or flexible so as to be able to absorb the thermally induced longitudinal variation of the heating elements in the support elements when required.

In order to be able to generate heat in the heating units by conducting an electric current through the latter, it is furthermore proposed that at least one heating unit in the first heating unit longitudinal end region thereof is connected in an electrically conducting manner to at least one further heating unit in the first longitudinal end region of the latter, or/and in the second heating unit longitudinal end region thereof is connected in an electrically conducting manner to at least one further heating unit in the second heating unit longitudinal end region of the latter, In particular in order to achieve a circuit of heating units in series here, at least one heating unit in the first heating unit longitudinal end region thereof can be connected in an electrically conducting manner to at least one further heating unit, and in the second heating unit longitudinal end region thereof can be connected in an electrically conducting manner to at least one other further heating unit.

Depending on the available on-board voltage and the voltage drop to be anticipated in the respective heating units, at least two, preferably all, heating units can be electrically mutually switched in parallel, or/and at least two, preferably all, heating units can be electrically mutually switched in series.

In one particularly advantageous configuration, at least two, preferably all, heating units in the first heating unit longitudinal end regions thereof, in a support element interior space which is delimited by the two U-legs of the first support element, can be connected in an electrically conducting manner to at least one further heating unit, or/and at least two, preferably all, heating units in the second heating unit longitudinal end regions thereof, in a support element interior space which is delimited by the two U-legs of the second support element, can be connected in an electrically conducting manner to at least one further heating unit. This also achieves the possibility of shielding that region in which heating units are electrically connected to one another in relation to the direct inflow of exhaust gas and thus in relation to excessive heating by way of a respective support element.

In one alternative configuration in which the regions of the electrical connection of heating units are likewise shielded in relation to the direct inflow of exhaust gas, it is proposed that at least two, preferably all, heating units in the first heating unit longitudinal end regions thereof penetrate a housing passage opening of the heating unit housing and are connected in an electrically conducting manner to one another or/and to at least one further heating unit on the external side of the heating unit housing, or/and that at least two, preferably all, heating units in the second heating unit longitudinal end regions thereof penetrate a housing passage opening of the heating unit housing and are connected in an electrically conducting manner to one another or/and to at least one further heating unit on the external side of the heating unit housing.

In order to preclude the egress of exhaust gas to the outside here, on the external side of the heating unit housing, so as to be assigned to the first heating unit longitudinal end regions, a first heating unit connection space which for electrically connecting at least two heating units in the first heating unit longitudinal regions thereof outside the heating unit housing is sealed in a substantially gas-tight manner by at least one cover element can be provided, or/and on the external side of the heating unit housing, so as to be assigned to the second heating unit longitudinal end regions, a second heating unit connection space which for electrically connecting at least two heating units in the second heating unit longitudinal end regions thereof outside the heating unit housing is sealed in a substantially gas-tight manner by at least one cover element can be provided.

An efficient thermal interaction between the heating units and the exhaust gas flow surrounding the latter can be achieved according to the present disclosure in that at least two, preferably all, heating units are disposed by way of heating unit longitudinal axes that are substantially mutually parallel, or/and that at least two, preferably all, heating units are disposed by way of heating unit longitudinal axes which lie in a plane that is substantially orthogonal to a housing longitudinal axis of the heating unit housing. With a view to a compact construction it is furthermore proposed that at least one, preferably each, heating unit is elongate in a rectilinear manner along the heating unit longitudinal axis.

An efficient flow of exhaust gas surrounding the heating units can also be facilitated in that the heating unit housing has a heating unit receptacle region having a substantially rectangular internal circumferential contour, wherein the heating units are disposed in the heating unit receptacle region, and that the heating unit housing in an upstream connector region has a substantially round internal circumferential contour, or/and in a downstream connector region has a substantially round internal circumferential contour. This achieves the possibility of linking an exhaust gas heating assembly according to the disclosure to other system regions of an exhaust gas system that generally have a round, for example a circular, cross-sectional geometry, while in the region in which the heating units are disposed, almost the entire flow cross section can be efficiently occupied by the heating units, the exhaust gas flowing through the heating unit housing thus being forced to thermally interact with the heating units.

The heating units can be configured as so-called jacket heating conductors, for example. For this purpose, at least one, preferably each, heating unit can include a jacket that is elongate in the direction of the heating unit longitudinal axis and in the jacket can include a heating conductor element, or/and on an external side of the jacket can include a heat transmission formation.

With a view to an efficient transmission of heat to the exhaust gas flow surrounding the heating units it is furthermore proposed that in at least one, preferably each, heating unit the heat transmission formation has a plurality of heat transmission portions which are successive in the direction of the heating unit longitudinal axis and are substantially mutually parallel, or/and that in at least one, preferably each, heating unit the heat transmission formation is configured in a meandering manner, having a plurality of heat transmission portions which are substantially mutually parallel and connected to one another by connection portions. With a view to reducing the number of components required for constructing an exhaust gas heating assembly according to the disclosure, it can alternatively or additionally be provided that at least one heat transmission formation is provided on the external side of the jackets of at least two heating units. By connecting individual heat transmission portions in a meandering structure, for example, an additional reinforcement and thus a further increase in terms of the resonance frequency of the heat transmission formation is thus achieved. The provision of the heat transmission portions in a meandering structure furthermore has the advantage that the heat transmission portions which are linked to one another, or adjoin one another, in the lateral end regions of the heat transmission portions have a lower tendency toward fluttering in the exhaust gas flow. In principle, the heat transmission portions, or some of the successive heat transmission portions, can also be separately provided and connected to one another by brazing, for example. This also leads to an increased rigidity of a respective heat transmission formation.

The disclosure furthermore relates to an exhaust gas system for an internal combustion engine, including at least one exhaust gas treatment assembly, preferably a catalytic converter or/and a particle filter, and an exhaust gas heating assembly constructed according to the disclosure, which is upstream of the at least one exhaust gas treatment assembly.

BRIEF DESCRIPTION OF THE DRAWINGS

The invention will now be described with reference to the drawings wherein.

DESCRIPTION OF THE PREFERRED EMBODIMENTS

Figure 1:
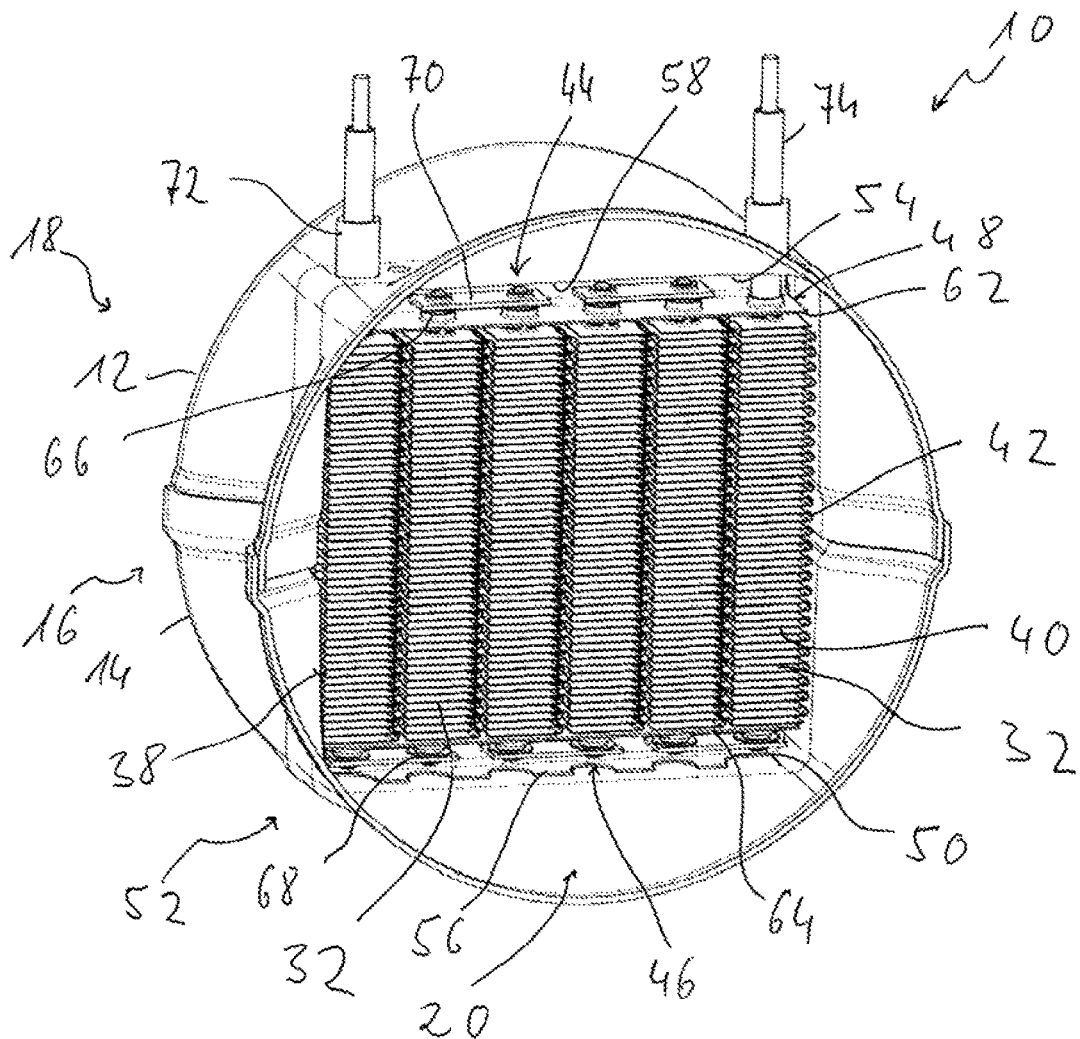
FIG. 1 shows a perspective view of an exhaust gas heating assembly.
Figure 2:
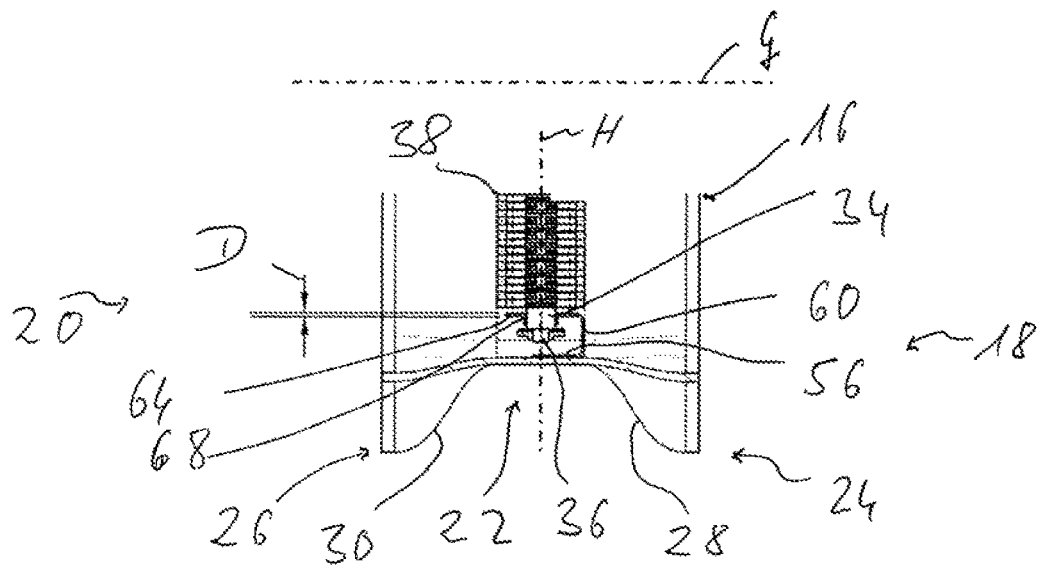
FIG. 2 shows a partial longitudinal sectional view of the lower region of the exhaust gas heating assembly of FIG. 1.

FIGS. 1 and 2 show a first embodiment of an exhaust gas heating assembly, generally identified by the reference sign 10, for an exhaust gas system of an internal combustion engine, for example in a vehicle. The exhaust gas heating assembly 10 includes a heating unit housing 16 which is constructed from two half-shells 12, 14. To be seen at the back in FIG. 1 is an inflow end 18 of the exhaust gas heating assembly 10 or, more specifically, of the heating unit housing 16, while an outflow end 20 of the exhaust gas heating assembly 10 or, more specifically, of the heating unit housing 16, lies to the front.

The heating unit housing 16 is constructed having three regions which are successive in the direction of a housing longitudinal axis G. A heating unit receptacle region 22 in which the heating unit housing 16 having a substantially rectangular, for example, a square, internal circumferential contour, is configured and provided in the center. The heating housing unit 16 on the inflow end 18 is configured having an upstream connector region 24 having a substantially round, for example circular, internal circumferential contour. Likewise, the heating unit housing 16 on the outflow end 20 is configured having a substantially round, for example circular, internal circumferential contour, providing a downstream connector region 26. The heating unit housing 16 in the upstream connector region 24 and in the downstream connector region 26, both in a respective approximately funnel-type transition region 28, 30 transitioning to the heating unit receptacle region 22, can be connected to other system regions of an exhaust gas system.

A plurality of heating units 32 which, in the heating unit receptacle region 22, are constructed so as to be substantially mutually identical are provided in the interior space enclosed by the heating unit housing 16. Each heating unit 32 includes a jacket heating conductor which is elongate in the direction of a heating unit longitudinal axis H, the jacket heating conductor having a tubular, substantially rigid, jacket 34 which is constructed using a metallic material, for example, and a heating conductor element 36 which runs in the interior of the jacket 34 and by an insulation material is held so as to be electrically insulated in relation to the jacket 34. In each heating unit 32 a heat transmission formation 38 is provided on an external side of the jacket 34, the heat transmission formation 38 in the configuration illustrated having in each case a meandering structure having a plurality of plate-type heat transmission portions 40 which are successive in the direction of the heating unit longitudinal axes H and in a central region are penetrated by the respective jacket 34, for example. The heat transmission portions 40 which are successive in the direction of the heating unit longitudinal axes H are connected to one another in bend-type connection regions 42. The heat transmission formations 38 can be connected to the jackets 34 which in each case penetrate the former by way of a press-fit or by heat shrinking, or/and can be attached to the jackets 34 in a materially integral manner, for example by brazing or the like.

Each of the heating units 32 has a first heating unit longitudinal end region 44, lying at the top in FIG. 1, and a second heating unit longitudinal end region 46, illustrated so as to lie at the bottom in FIG. 1. The heating units 32 in the first heating unit longitudinal end regions 44 thereof are attached to the heating unit housing 16 by way of a first support element 48 which is configured so as to be substantially U-shaped and bent from a sheet-metal material, for example. The heating units 32 in the second heating unit longitudinal end regions 46 thereof are likewise attached to the heating unit housing 16 in the heating unit receptacle region 22 by way of a second U-shaped support element 50 which is likewise bent from a sheet-metal material. The two support elements 48, 50 conjointly form a support structure 52 via which the heating units 32 are supported on the heating unit housing 16. The heating units 32 in the configuration illustrated in FIG. 1 here are disposed in such a manner that the heating unit longitudinal axes H thereof are mutually parallel and lie in a plane that is substantially orthogonal to the housing longitudinal axis G. The total of six heating units 32 thus occupy substantially the entire cross section of the heating unit housing 16 in the heating unit receptacle region 22 that is able to be passed by an exhaust gas flow so that an efficient thermal interaction between the exhaust gas and the heating units 32 is achieved.

Each of the two U-shaped support elements 48, 50 of the support structure 52 has a first U-leg 54, 56 which is fixed on the internal surface of the heating unit housing 16 by a materially integral connection, for example, such as brazing or welding, for example, as well as a second U-leg 62, 64 which is connected to the first U-leg 54, 56 by way of a respective connecting web 58, 60. Support element passage openings 66, 68, which are provided by rim holes, for example, are formed in the second U-legs 62, 64 of the support elements 48, 50, the heating units 32 by way of the respective jacket 34 thereof extending through the support element passage openings 66, 68 such that the heating units 32 in the region of the first heating unit longitudinal end regions 44 thereof and the second heating unit longitudinal end regions 46 thereof are supported on the support elements 48, 50 and via the latter supported on the heating unit housing 16.

The heating units 32 are connected to one another in an electrically conducting manner in support element interior spaces which are delimited by the U-legs 54, 62 and 56, 64, respectively, and the connecting webs 58, 60. To this end, plate-type connection elements 70, for example from a sheet-metal material, which are attached by way of a materially integral connection, for example, such as brazing, for example, to the heating conductor elements 36 of the heating units 32 to be connected to one another in an electrically conducting manner, can be used. In the configuration illustrated in FIG. 1, the six heating units 32 lying next to one another are electrically connected in series. The two outermost heating units 32 by way of respective conduits 72, 74 are connected to a voltage source which lies outside the heating unit housing 16, and the heating units 32 that lie between the two outermost heating units 32, in an alternating manner in the first heating unit longitudinal end region 44 thereof and the second heating unit longitudinal end region 46 thereof, by way of one of the connection elements 70 are connected in an electrically conducting manner to a directly adjacent heating unit 32, such that the heating units 32 are connected in series.

It can be seen in FIGS. 1 and 2 that the support elements 48, 50 are disposed in the heating unit housing 16 such that the connecting webs 58, 60 thereof lie in each case so as to be oriented in the upstream direction, thus toward the inflow end 18. Those regions in which the heating units 32 by way of the connection elements 70 are connected to one another in an electrically conducting manner are thus shielded in relation to the direct inflow of exhaust gas and thus protected against excessive heating. Furthermore, the support elements 48, 50 in the first and the second heating unit longitudinal end regions 44, 46 block the flow path such that the exhaust gas which in an exhaust gas primary flow direction A flows toward the heating units 32 is forced to flow about the heating units 32 in the region of the heat transmission formation 38.

In those regions in which the heating units 32 in the first heating unit longitudinal end regions 44 thereof penetrate the second U-leg 62 of the first support element 48, the heating units 32 by way of the respective jacket 34 thereof can be set on the second U-leg 62 by way of a materially integral connection, for example by brazing. Likewise, the heating units 32 in the second heating unit longitudinal end regions 46 thereof can be set on the second U-leg 64 of the second support element 50 by way of a materially integral connection, for example by brazing. The two support elements 48, 50 per se are flexible, thus deformable, in the direction of the heating unit longitudinal axes H of the heating units 32 such that a longitudinal variation D of the heating units 32 which arises when heating or cooling, respectively, can be absorbed by the flexibility, thus the elastic deformation of the support elements 48, 50 because the heating units 32 in the first and the second heating unit longitudinal end regions 44, 46 thereof are supported on the support structure 52 so as to be movable in the heating unit longitudinal direction H, in particular supported conjointly with the respective second U-leg 62 or 64, respectively, so as to be movable in the direction of the heating unit longitudinal axes H. Excessive stress on the connection regions between the heating units 32 and the support elements 48, 50 in expansion or contraction, respectively, of the heating units 32 in the direction of the heating unit longitudinal axes H thereof, which repeatedly arises during operation, is thus avoided.

As a result of the choice of the material, or else the shaping, respectively, of the support elements 48, 50, the latter can be adapted to the mass of the heating units 32 in such a manner that any excitation of the vibration can be avoided during operation. The elastic deformation capability of the support elements 48, 50 in the direction of the heating unit longitudinal axes H can furthermore be chosen such that a lateral deflection movement of the heating units 32, which in principle extend in a substantially rectilinear manner in the direction of the heating unit longitudinal axes H, is avoided in particular during heating of the heating units 32 which arises in the heating operation, and thus during the expansion of the heating units 32 in the direction of the heating unit longitudinal axes H, this also avoiding mutual contact between directly adjacent heating units 32.

In an alternative type of configuration, the heating units 32 by way of the respective jackets 34 thereof can be held by a press-fit in the support element passage openings 66, 68, or the rim holes formed in the region of these support element passage openings 66, 68, respectively. This press-fit can be so firm that a fixed connection to the support elements 48, 50 is created as a result, and the heating units 32 in the first and the second heating unit longitudinal end regions 44, 46 thereof, conjointly with the respective second U-legs 62, 64 of the support elements 48, 50, can move in the direction of the heating unit longitudinal axes H.

In a further alternative configuration, the heating units 32 in the first and the second heating unit longitudinal ends 44, 46 thereof can be supported in the support element passage openings 66, 68 so as to be movable in the direction of the heating unit longitudinal axes H. In this configuration, the support elements 48, 50 can thus be configured so as to be substantially rigid so that the mobility of the heating units 32 in the respective heating unit longitudinal end regions 44, 46 thereof is guaranteed in that the heating unit longitudinal end regions 44, 46 in the respective second U-legs 62, 64, or the support element passage openings 66, 68 formed therein, respectively, can be displaced in the direction of the heating unit longitudinal axes H. Also in this configuration, the jackets 34 of the heating units 32 for a fundamentally defined mounting can be held in the respective support element passage openings 66, 68 while generating a friction-fit, wherein this friction-fit is fundamentally configured such that a relative movement between the heating unit longitudinal end regions 44, 46 and the second U-legs 62, 64 can arise during a thermal expansion or contraction of the heating units 32.

As a result of this relative mobility of the heating units 32 in relation to the support elements 48, 50, it is achieved that the movement of the heating units 32 is fundamentally decoupled from the support elements 48, 50 in such a manner that an excitation of vibrations of the heating units 32 by way of the resonance frequency of the latter cannot take place when vibrations arise in an exhaust gas system.

The different types of attachments of the heating units 32 to the support elements 48, 50 described above can in principle be combined with one another. The heating units 32 in the first heating unit longitudinal end regions 44 thereof and the second longitudinal end regions 46 thereof can thus be attached to the support elements 48, 50, or the second U-legs 62, 64 of the latter, respectively, in the same manner. Alternatively, it is possible for a fixed attachment, for example by way of a materially integral connection or by way of a firm press-fit, to be generated in one of the heating unit longitudinal end regions 44, 46, for example, while the heating units 32 in the other of the two heating unit longitudinal end regions 44, 46 can be received so as to be displaceable in the respective assigned support element passage openings 66 and 68, respectively. For the avoidance of vibration excitations it is however advantageous for the heating units 32 in both heating unit longitudinal end regions 44, 46 to be attached to the support elements 48 in the same manner.

Figure 3:
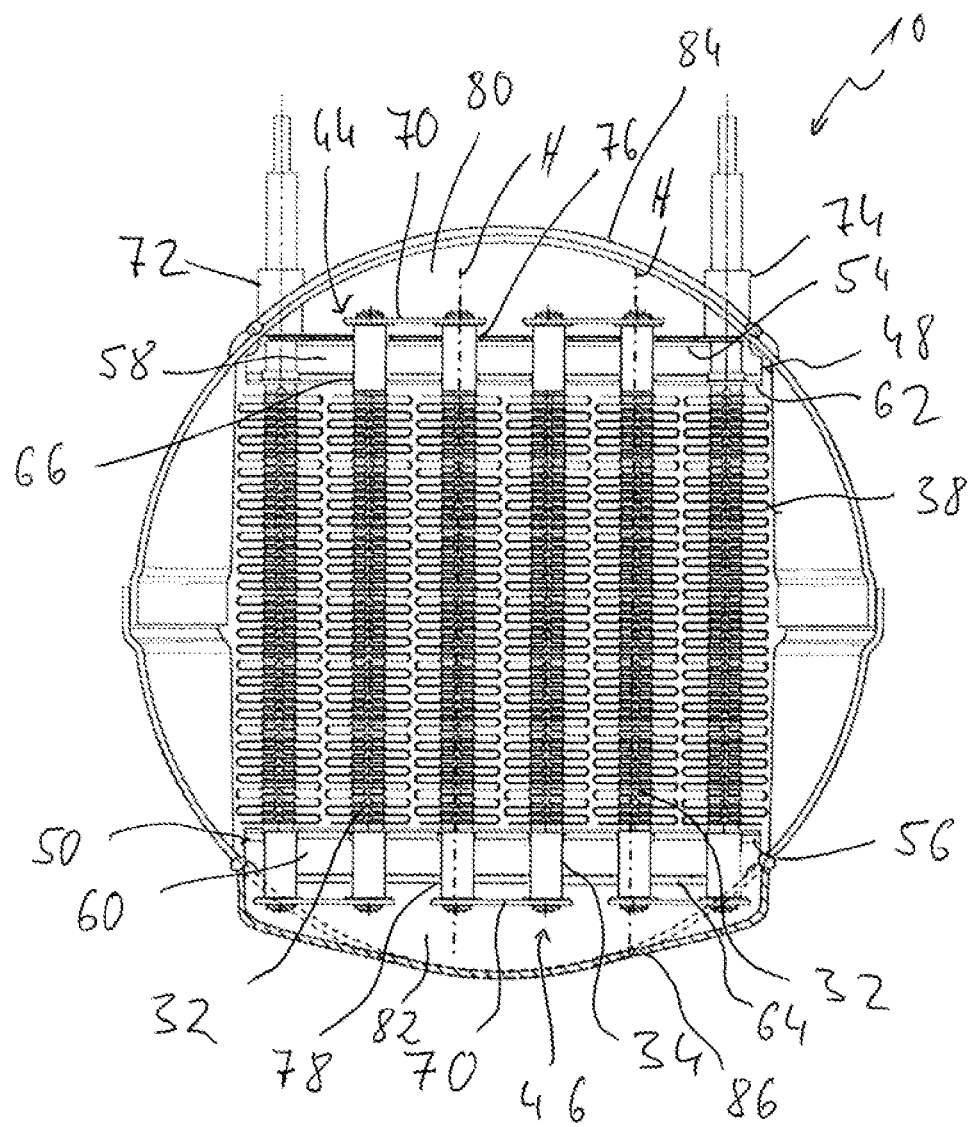
FIG. 3 shows an axial view of an exhaust gas heating assembly of an alternative configuration.
Figure 4:
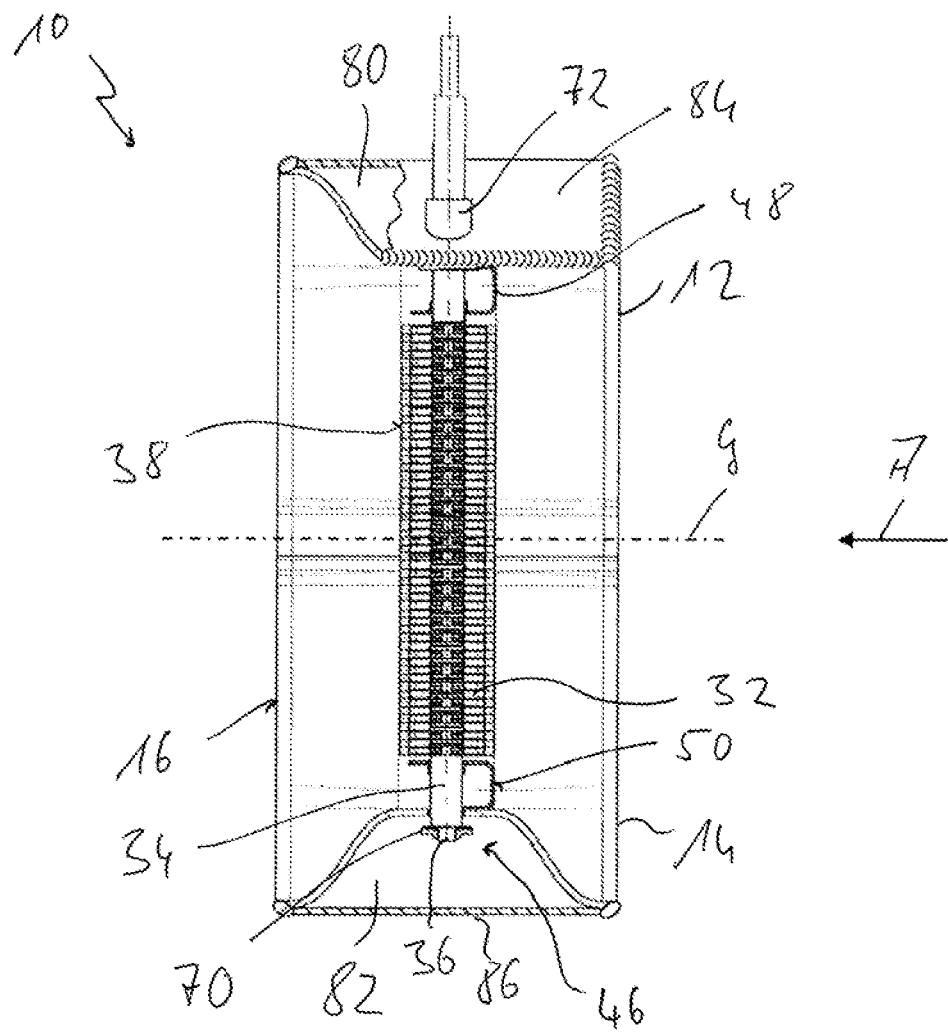
FIG. 4 shows a longitudinal sectional view of the exhaust gas heating assembly of FIG. 3.

An alternative configuration of an exhaust gas heating assembly 10 is illustrated in FIGS. 3 and 4. Also in this configuration, a plurality of heating units 32 in the heating unit receptacle region 22 of the heating unit housing 16 are disposed next to one another so as to be transverse to the housing longitudinal axis G such that the heating unit longitudinal axes H of the heating units 32 again lie so as to be substantially mutually parallel and in a plane that is substantially orthogonal to the housing longitudinal axis G, the plane potentially corresponding to the drawing plane of FIG. 3.

The heating units 32 by way of the first and the second heating unit longitudinal end regions 44, 46 thereof are supported in the previously described manner on the support elements 48, 50, or the second U-legs 62, 64, thereof, respectively, in such a manner that the heating unit longitudinal end regions 44, 46 in the event of a thermally induced longitudinal variation can move in the direction of the heating unit longitudinal axes H.

Additionally, the heating units 32, by way of the first and the second heating unit longitudinal end regions 44, 46 thereof, also penetrate housing passage openings 76, 78 that are provided in the heating unit housing 16 in the heating unit receptacle region 22. The heating units 32 in the event of a thermally induced longitudinal variation can thus move in the region of the housing passage openings 76, 78. In order to avoid any leakage of exhaust gas in the region of the housing passage openings 76, 78 here, a first heating unit connection space 80, which is formed on the external side of the heating unit housing 16 and in which the heating units 32 in the first heating unit longitudinal end regions 44 thereof are connected to one another in a conducting manner, and a second heating unit connection space 82, in which the heating units 32 in the second heating unit longitudinal end regions 46 thereof are connected to one another in an electrically conducting manner, are sealed in a gas-tight manner by a respective lid-type cover element 84, 86 which is substantially curved. The cover elements 84, 86 can be attached to the heating unit housing 16 by way of a materially integral connection, for example brazing or welding. The conduits 72, 74 which are required for connecting the heating units 32 to the voltage source that lies outside the heating unit housing 16 and to which the two outermost heating units 32 are connected in an electrically conducting manner, here also penetrate the cover element 84 and in the cover element 84 are sealed in a gas-tight manner in relation to the latter.

A total of six heating units 32 are mutually switched in series also in the configuration illustrated in FIGS. 3 and 4, wherein the connection elements 70 are now positioned outside the heating unit housing 16 such that the regions in which the connection elements 70 are attached to the heating conductor elements 36 of the different heating units 32 are shielded in relation to the inflow of exhaust gas and thus protected against excessive thermal stress.

Figure 5:
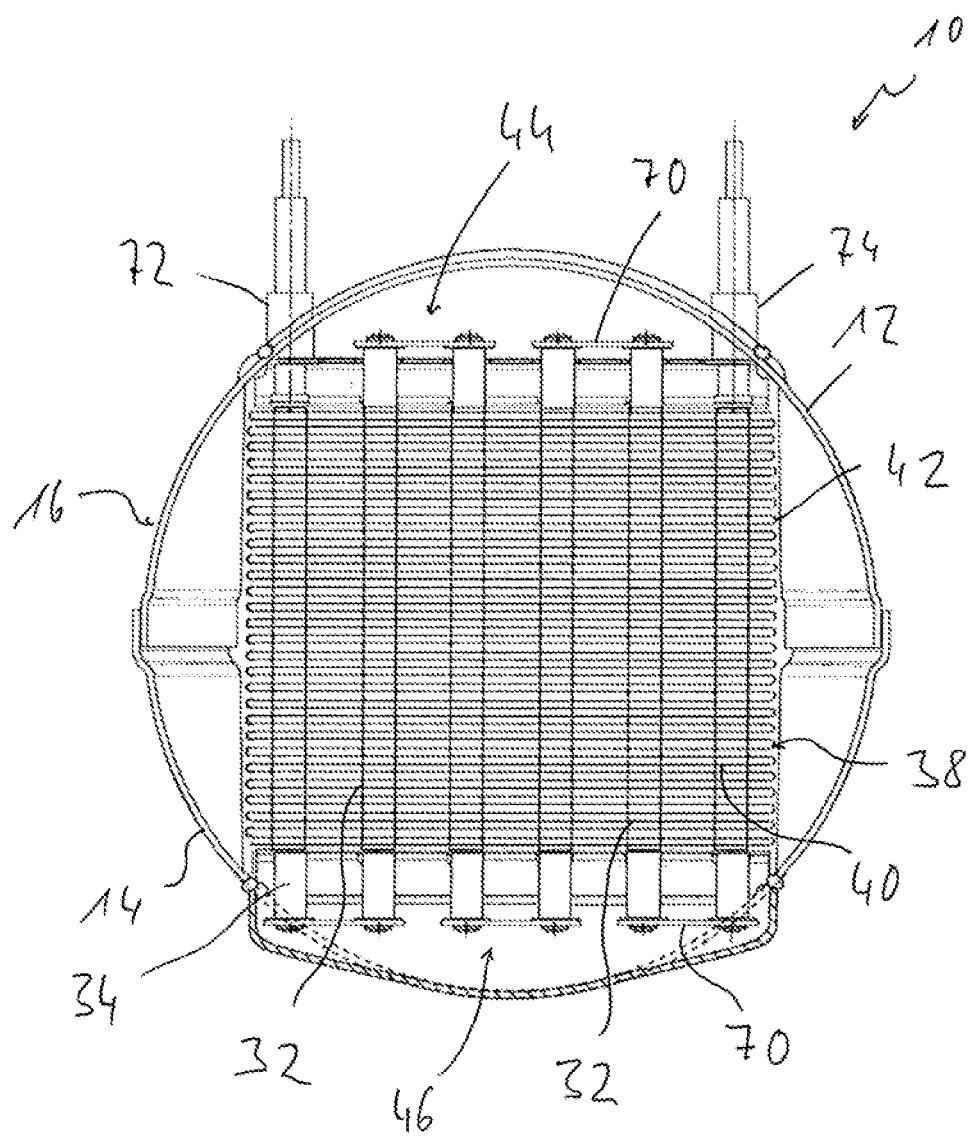
FIG. 5 shows a further axial view of an exhaust gas heating assembly of an alternative configuration.
Figure 6:
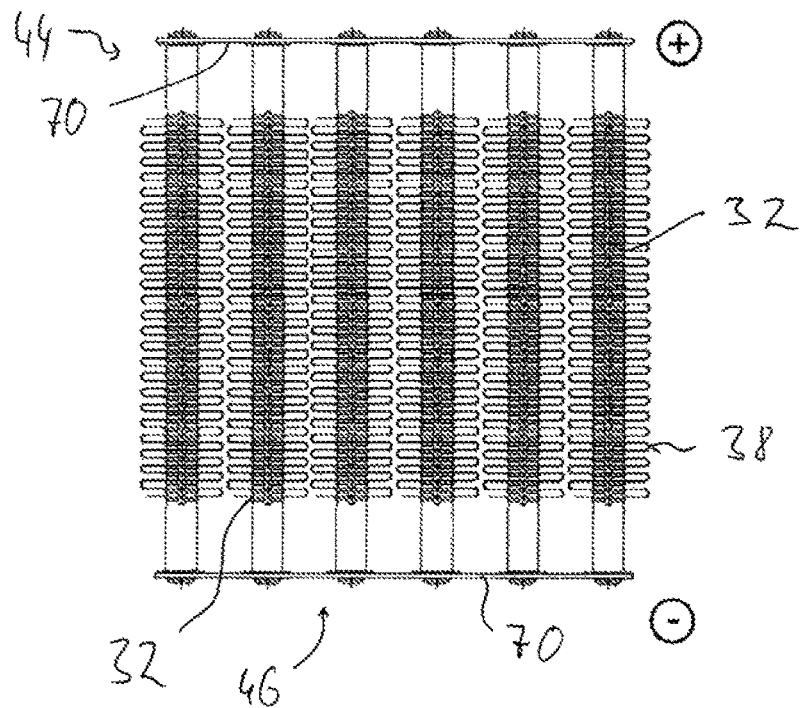
FIG. 6 is a circuit diagram for a plurality of exhaust gas heating units.

The configuration of FIGS. 3 and 4 could also be combined with the configuration of FIGS. 1 and 2. For example, the heating units 32 by way of the first heating unit longitudinal end regions 44 thereof could be integrated in the exhaust gas heating assembly 10 in the manner illustrated in FIGS. 1 and 2, for example, while the heating units 32 in the second heating unit longitudinal end regions 46 thereof can be integrated in the exhaust gas heating assembly 10 in the manner illustrated in FIGS. 3 and 4. The reversed arrangement is also possible An alternative configuration of an exhaust gas heating assembly 10 is illustrated in FIG. 5. This alternative embodiment corresponds fundamentally to the configuration principle illustrated in FIGS. 3 and 4 and differs therefrom in that the jackets 34 of a plurality of heating units 32, in the configuration illustrated of all heating units 32, interact with the same heat transmission formation 38. This heat transmission formation 38, transversely to the housing longitudinal axis G and the exhaust gas primary flow direction A, the latter being oriented substantially in the direction of the housing longitudinal axis G, extends across all heating units 32 and thus contacts the jackets 34 of all heating units 32. This heat transmission formation 38 fundamentally also has the above-described meandering structure having the substantially mutual parallel, plate-type heat transmission portions 40 and the connection regions 42 connecting the latter.

It is to be pointed out that in this configuration, or also in the previously described configurations, respectively, in which each heating unit 32 has a heat transmission formation 38 which is assigned exclusively to the heating unit 32, a respective heat transmission formation 38 can also be structured in another way. For example, a plurality of plate-type heat transmission portions which are separately constructed can thus be provided on the respective jacket 34. In principle, a heat transmission formation 38 of this type could also have a structure which surrounds a respective jacket 34 in the manner of a coil.

FIGS. 6 to 9 illustrate various circuit diagrams for the electric circuit diagram of the heating units 32 provided in the heating unit housing 16. In the circuit diagram illustrated in FIG. 6, all heating units 32 are mutually switched in parallel. All heating units 32 in the first heating unit longitudinal end regions 44 thereof and the second heating unit longitudinal end regions 46 thereof are connected to one another in a conducting manner by a respective connection element 70. The two conduits 72, 74, by way of which the heating units 32 can be connected to a voltage source, in this configuration can be disposed on mutually opposite regions of the heating unit housing so as to extend away from one another. The configuration illustrated in FIG. 6, when used in conjunction with an on-board voltage system which supplies a voltage of 12 V, leads to a voltage drop in the range of 12 V being able to arise in each of the heating units 32 which are constructed in a substantially mutually identical manner.

Figure 7:
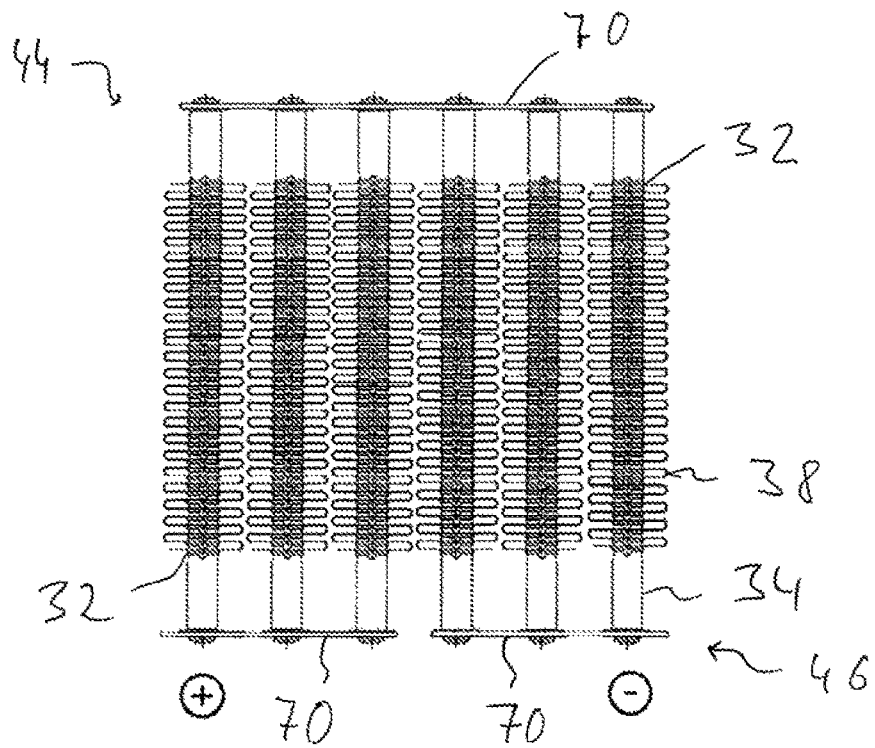
FIG. 7 is a schematic, corresponding to FIG. 6, of an alternative circuit diagram of the exhaust gas heating units.

FIG. 7 shows an embodiment in which three mutually adjacent heating units 32 are in each case mutually switched in parallel, and the two packs of in each case three heating units 32 that are mutually switched in parallel are mutually switched in series. A construction of this type can be used, for example, when an on-board voltage system supplies a voltage of 24 V, wherein a voltage drop of approximately 12 V will also in this case arise in each of the heating units 32 which are constructed in a substantially mutually identical manner.

Figure 8:
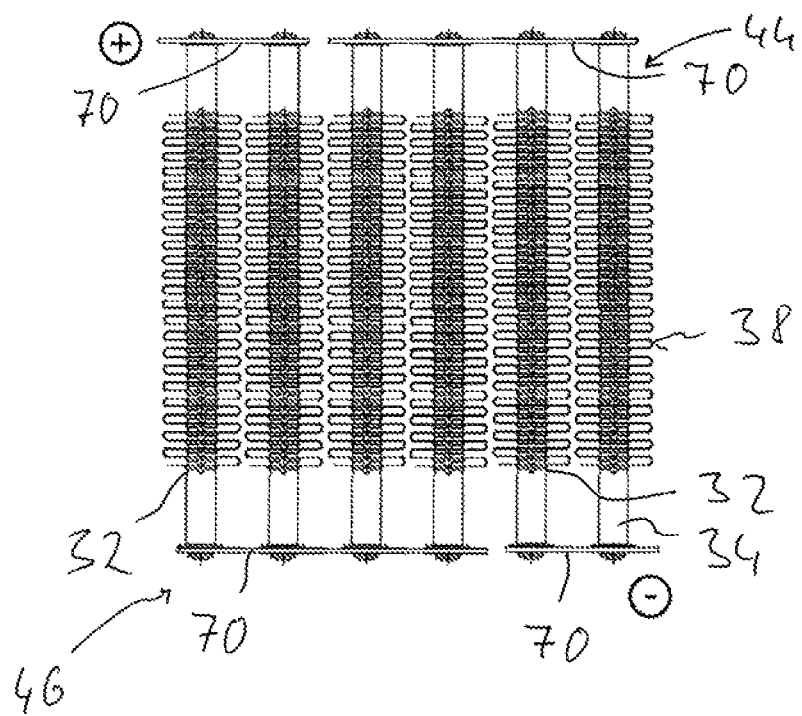
FIG. 8 is a schematic, corresponding to FIG. 6, of an alternative circuit diagram of the exhaust gas heating units; and, FIG. 9 is a schematic, corresponding to FIG. 6, of an alternative circuit diagram of the exhaust gas heating units.

FIG. 8 shows an embodiment in which three packs of in each case two mutually directly adjacent heating units 32 that are mutually switched in parallel are mutually switched in series. When used in conjunction with an on-board voltage system which can supply an on-board voltage of 36 V, a voltage drop of approximately 12 V will also arise in this circuit diagram in each of the heating units 32 which are constructed in a substantially mutually identical manner.

Figure 9:
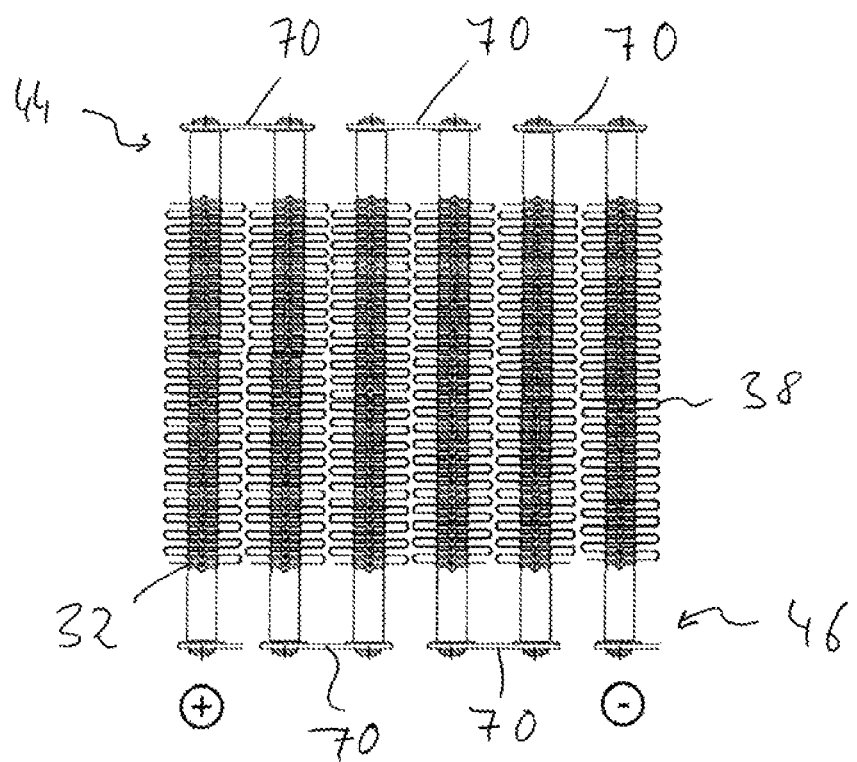

FIG. 9 shows the serial circuit diagram of all heating units 32 which has been described above with reference to FIGS. 1 to 5. When used in conjunction with an on-board voltage system which can supply a voltage in the region of 72 V, a voltage drop of approximately 12 V also arises in this circuit diagram in each of the heating units 32 which are constructed in a substantially mutually identical manner.

The examples for the parallel or serial arrangement, respectively, of different heating units 32 described above with reference to FIGS. 6 to 9 show that it is possible for the heating units 32, in order to be adapted to various on-board voltage systems, to be electrically switched such that the substantially same voltage drop arises in each of the heating units so that a uniform thermal input into the exhaust gas flow surrounding the heating units 32 is achieved in the entire cross section of the exhaust gas heating assembly 10.

In the exhaust gas heating assembly described above, efficient heating of the exhaust gas flow passing through the heating unit housing is achieved without excessive stress arising in those regions in which the heating units are supported in relation to the heating unit housing, the excessive stress being introduced as a result of a thermal longitudinal variation of the heating units during the heating operation of the exhaust gas heating assembly. The exhaust gas heating unit enables efficient heating of the exhaust gas flow surrounding the heating units such that the exhaust gas, in particular in a start-up phase of the combustion operation, can transmit the heat absorbed in the exhaust gas to an exhaust gas treatment assembly positioned downstream, for example a catalytic converter or a particle filter, respectively, in order for the latter to be heated and thus to be brought to a state in which an efficient treatment of the exhaust gas and thus an efficient reduction of the proportion of pollutants contained in the exhaust gas can be achieved in an ideally rapid manner.

As a result of the configuration of the heating unit housing having the downstream connector region, which adjoins the heating unit receptacle region so as to widen in the manner of a funnel and in which a transition to a round, for example circular or elliptic, cross-sectional contour is achieved, the heating unit housing can be integrated into an exhaust gas system in such a manner that an exhaust gas treatment assembly that follows downstream can be easily connected. For example, the exhaust gas heating unit having the heating unit housing can provide the funnel region which is provided in an upstream part of an exhaust gas treatment assembly in general.

It is understood that the foregoing description is that of the preferred embodiments of the invention and that various changes and modifications may be made thereto without departing from the spirit and scope of the invention as defined in the appended claims.

What is claimed is:

1. An exhaust gas heating assembly for an exhaust gas system of a combustion engine, the exhaust gas heating assembly comprising:

a heating unit housing for accommodating a flow of exhaust gas therethrough;

a plurality of heating units mounted in said heating unit housing extending rectilinearly along respective heating unit longitudinal axes (H), said longitudinal axes (H) of said heating units being arranged mutually parallel;

each of said heating units being elongated along the heating unit longitudinal axis (H) corresponding thereto and comprising a jacket elongated in the direction of the heating unit longitudinal axis (H) corresponding thereto, a heat conductor element within said jacket, and a heat transmission formation on an external side of said jacket;

each of said heating units having a first axial heating unit longitudinal end region and a second axial heating unit longitudinal end region;

a support structure supporting said plurality of heating units at said first and second axial heating unit longitudinal end regions so as to be supported in relationship to said heating unit housing; and, said jackets of said heating units being supported at least at one of said first and second axial heating unit longitudinal end regions on said support structure so as to be movable in the direction of said longitudinal axis (H) corresponding thereto.

2. The exhaust gas heating assembly of claim 1, wherein said support structure, in assignment to said first axial heating unit longitudinal end regions, includes:
a first support element supported on said heating unit housing and said first support element having a plurality of pass-through openings;
said pass-through openings of said first support element being penetrated by corresponding ones of said heating units; and/or,
said support structure, in assignment to said second axial heating unit longitudinal end regions, including a second support element supported on said heating unit housing and said second support element having a plurality of pass-through openings; and,
said pass-through openings of said second support element being penetrated by corresponding ones of said heating units.

3. The exhaust gas heating assembly of claim 2, wherein:
the first axial heating unit longitudinal end region of at least one of said heating units penetrates a corresponding pass-through opening of said first support element in such a manner that the first axial heating unit longitudinal end region is movable relative to said first support element in the direction of said heating unit longitudinal axis (H); and/or,
the second axial heating unit longitudinal end region of at least one of said heating units penetrates a corresponding pass-through opening of said second support element in such a manner that the second axial heating unit longitudinal end region is movable relative to said second support element in the direction of said heating unit longitudinal axis (H).

4. The exhaust gas heating assembly of claim 2, wherein:
said first support element is flexible in the direction of the heating unit longitudinal axis (H); and,
the first axial heating unit longitudinal end region of at least one of said heating units is set on said first support element; and/or,
said second support element is flexible in the direction of said heating unit longitudinal axis (H); and,
the second axial heating unit longitudinal end region of at least one of said heating units is set on said second support element.

5. The exhaust gas heating assembly of claim 2, wherein:
said first support element is configured so as to be substantially U-shaped having first and second U-legs and a connecting web connecting said first and second U-legs;
said first U-leg of said first support element is set on said heating unit housing and said pass-through openings of said first support element are provided in said second U-leg of said first support element; or/and,
said connecting web of said first support element is disposed in a direction toward an inflow end of the heating unit housing; or/and
said second support element is configured so as to be substantially U-shaped having first and second U-legs and a connecting web connecting said first and second U-legs thereof;
said first U-leg of said second support element is set on the heating unit housing and the pass-through openings of the second support element are provided in said second U-leg of said second support element; and/or,
said connecting web of said second support element is disposed in said direction toward said inflow end of the heating unit housing.

6. The exhaust gas heating assembly of claim 5, wherein:
at least a first heating unit of said plurality of heating units is electrically connected in the first axial heating unit longitudinal end region thereof with at least a second one of said plurality of heating units in the first axial heating unit longitudinal end region thereof and/or in the second axial heating unit longitudinal end region of said second heating unit; and, said second heating unit is electrically connected with at least a third heating unit of said plurality of heating units in the second axial heating unit longitudinal end region thereof;
said first support element has a first inner space conjointly defined by said U-legs thereof;
said second support element has a second inner space conjointly defined by said U-legs thereof;
at least two heating units of said plurality of heating units in their respective first axial heating unit longitudinal end regions are electrically connected to a further heating unit in said first inner space; and/or,
at least two of said heating units of said plurality of heating units in their respective second axial heating unit longitudinal end regions are electrically connected in said second inner space to a further one of said heating units.

7. The exhaust gas heating assembly of claim 1, wherein at least a first heating unit of said plurality of heating units is electrically connected in the first axial heating unit longitudinal end region thereof with at least a second one of said plurality of heating units in the first axial heating unit longitudinal end region thereof and/or in the second axial heating unit longitudinal end region of said second heating unit; and, said second heating unit is electrically connected with at least a third heating unit of said plurality of heating units in the second axial heating unit longitudinal end region thereof.

8. The exhaust gas heating assembly of claim 7, wherein:
said heating unit housing has first and second housing pass-through openings;
said first and second heating units penetrate said first housing pass-through opening with corresponding first axial heating unit longitudinal end regions thereof so as to permit said first axial heating unit longitudinal end regions to be mutually electrically connected outside of said heating unit housing and/or with said third heating unit; and/or,
said first and second heating units penetrate said second housing pass-through opening with corresponding second axial heating unit longitudinal end regions thereof so as to permit said second axial heating unit longitudinal end regions thereof to be mutually electrically connected outside of said heating unit housing and/or with said third heating unit.

9. The exhaust gas heating assembly of claim 8, wherein:
said heating unit housing has an external side and a first heating unit connection chamber for electrically connecting therein at least two of said plurality of heating units at the first axial heating unit longitudinal end regions corresponding thereto outside of said heating unit housing;
said first heating unit connection chamber is disposed on said external side and has a cover closing off said first chamber essentially gas-tight; and/or, said heating unit housing has a second heating unit connection chamber for electrically connecting therein at least two of said plurality of heating units at the second axial heating unit longitudinal end regions corresponding thereto outside of said heating unit housing; and, said second heating unit connection chamber is disposed on said external side and has a cover closing off said second chamber essentially gas tight.

10. The exhaust gas heating assembly of claim 1, wherein at least a first heating unit of said plurality of heating units is electrically connected in the first axial heating unit longitudinal end region thereof with at least a second heating unit of said plurality of heating units and, in the second axial heating unit longitudinal end region thereof, is electrically connected to at least a third heating unit of said plurality of heating units.

11. The exhaust gas heating assembly of claim 1, wherein said heating units are electrically switched in parallel and/or said heating units are electrically switched in series.

12. The exhaust gas heating assembly of claim 1, wherein:
said heating unit housing defines a housing longitudinal axis (G);
the respective longitudinal axes (H) of said at least two heating units conjointly define a common plane lying orthogonally to said housing longitudinal axis (G).

13. The exhaust gas heating assembly of claim 1, wherein:
said heating unit housing has a heating unit receptacle region having a substantially rectangular internal circumferential contour with said heating units disposed in said heating unit receptacle region;
said heating unit housing has an upstream connection region and downstream connection region and a substantially round internal circumferential contour in said upstream connection region; and/or,
said heating unit housing has a substantially round internal circumferential contour in said downstream connection region.

14. The exhaust gas heating assembly of claim 1, wherein:
said heat transmission formation includes a plurality of heat transmission sections arranged successively in the direction of the heating unit longitudinal axis (H) corresponding to said at least one heating unit; and,
said heat transmission sections of said heat transmission formation are substantially mutually parallel.

15. The exhaust gas heating assembly of claim 1, wherein:
said heat transmission formation is configured in a meandering manner and includes a plurality of heat transmission sections mutually substantially in parallel; and,
said heat transmission formation further includes a plurality of connection segments interconnecting said plurality of heat transmission sections one with the other.

16. The exhaust gas heating assembly of claim 1, wherein said jacket has an outer side; and, said heat transmission formation is provided on said outer side of said jacket.

17. An exhaust gas system for a combustion engine, the exhaust gas system comprising:
an exhaust gas treatment unit;
an exhaust gas heating assembly connected to and upstream of said exhaust gas treatment unit;
said exhaust gas heating assembly including:
a heating unit housing for accommodating a flow of exhaust gas therethrough;
a plurality of heating units mounted in said heating unit housing extending rectilinearly along respective heating unit longitudinal axes (H), said longitudinal axes (H) of said heating units being arranged mutually parallel;
each of said heating units being elongated along the heating unit longitudinal axis (H) corresponding thereto and comprising a jacket elongated in the direction of the heating longitudinal axis (H) corresponding thereto, a heat conductor element within said jacket, and a heat transmission formation on an external side of said jacket;
each of said heating units having a first axial heating unit longitudinal end region and a second axial heating unit longitudinal end region;
a support structure supporting said plurality of heating units at said first and second axial heating unit longitudinal end regions so as to be supported in relationship to said heating unit housing; and,
said jackets of said heating units being supported at least at one of said first and second axial heating unit longitudinal end regions thereof on said support structure so as to be movable in the direction of said longitudinal axis (H).

18. The exhaust gas system of claim 17, wherein said exhaust gas treatment unit includes a catalytic converter and/or a particle converter.

* * * * *